US011267361B2

(12) United States Patent
He et al.

(10) Patent No.: US 11,267,361 B2
(45) Date of Patent: Mar. 8, 2022

(54) SYSTEM AND METHOD FOR ORDERED CHARGING MANAGEMENT OF CHARGING STATION

(71) Applicants: HANGZHOU POWER SUPPLY COMPANY OF STATE GRID ZHEJIANG ELECTRIC POWER, Zhejiang (CN); ZHEJIANG DAYOU INDUSTRIAL CO., LTD. HANGZHOU SCIENCE TECHNOLOGY DEVELOPMENT BRANCH COMPANY, Zhejiang (CN)

(72) Inventors: Chunlin He, Zhejiang (CN); Peijun Chen, Zhejiang (CN); Zhengxian Zheng, Zhejiang (CN); Xingping Yan, Zhejiang (CN)

(73) Assignee: HANGZHOU POWER SUPPLY COMPANY OF STATE GRID ZHEJIANG ELECTRIC POWER

( * ) Notice: Subject to any disclaimer, the term of this patent is extended or adjusted under 35 U.S.C. 154(b) by 519 days.

(21) Appl. No.: 16/345,831

(22) PCT Filed: Feb. 19, 2019

(86) PCT No.: PCT/CN2019/075432
§ 371 (c)(1),
(2) Date: Apr. 29, 2019

(87) PCT Pub. No.: WO2020/034614
PCT Pub. Date: Feb. 20, 2020

(65) Prior Publication Data

US 2021/0354583 A1 Nov. 18, 2021

(30) Foreign Application Priority Data

Aug. 15, 2018 (CN) ........................ 201810929691.1

(51) Int. Cl.
*B60L 53/63* (2019.01)
*H02J 7/00* (2006.01)
*B60L 53/30* (2019.01)

(52) U.S. Cl.
CPC ............... *B60L 53/63* (2019.02); *B60L 53/30* (2019.02); *H02J 7/0029* (2013.01); *H02J 7/0047* (2013.01)

(58) Field of Classification Search
CPC ........ B60L 53/63; B60L 53/30; H02J 7/0047; H02J 7/0029

(Continued)

(56) References Cited

U.S. PATENT DOCUMENTS

2020/0294078 A1* 9/2020 Hu et al. ............ G06Q 30/0207

FOREIGN PATENT DOCUMENTS

CN 103559567 2/2014
CN 104836273 8/2015

(Continued)

OTHER PUBLICATIONS

Patent Cooperation Treaty (PCT), International Search Report and Written Opinion for Application PCT/CN2019/0754352 filed on Feb. 19, 2019, dated May 14, 2019, International Searching Authority, CN.

*Primary Examiner* — Sun J Lin
(74) *Attorney, Agent, or Firm* — McDonald Hopkins LLC

(57) ABSTRACT

Provided herein are a system and method for ordered charging management of a charging station. The system includes a charging station control-management device, a charging pile monitoring device and a system platform server. The system platform server is configured to send a power capacity of the charging station to the charging station control-management device corresponding to the charging station. The charging pile monitoring device is configured to (Continued)

101
Charging pile monitoring device
Charging pile monitoring device
102
Charging station control-management device
103
System platform server
Charging pile monitoring device
Charging pile monitoring device
Charging station control-management device collect an operating parameter of a charging pile corresponding to the charging pile monitoring device and to send the operating parameter to the charging station control-management device. The charging station control-management device is configured to determine whether the charging station has a power headroom according to the power capacity and the operating parameter of all charging piles at the charging station after receiving a charging request sent by the charging pile monitoring device.

14 Claims, 2 Drawing Sheets

(58) Field of Classification Search
USPC .......................................................... 320/109
See application file for complete search history.

(56) References Cited

FOREIGN PATENT DOCUMENTS

| | | |
|---|---|---|
| CN | 105186504 | 12/2015 |
| CN | 106873552 | 6/2017 |
| CN | 108879884 | 11/2018 |
| CN | 108973752 | 12/2018 |

* cited by examiner

SYSTEM AND METHOD FOR ORDERED CHARGING MANAGEMENT OF CHARGING STATION

CROSS REFERENCE TO RELATION APPLICATIONS

This application is a 35 U.S.C. 371 national stage filing of PCT Application No. PCT/CN2019/075432 filed on Feb. 19, 2019, which claims priority to a Chinese patent application No. 201810929691.1 filed on Aug. 15, 2018, disclosures of which are incorporated herein by reference in their entireties.

TECHNICAL FIELD

The present disclosure relates to the field of charging control technologies for electric vehicle charging stations and, for example, relates to a system and method for ordered charging management of a charging station.

BACKGROUND

With increasingly serious resource shortage and environmental pollution, more and more countries are promoting green travel. Electric vehicles are widely promoted and applied because their energy consumption and exhaust emissions are reduced. The large-scale application of electric vehicles requires a large number of charging piles to provide charging services. The increase in the number of charging piles can alleviate the intense charging demand, but in the disordered and random charging mode, transient overload is likely to occur at the charging station, seriously affecting the load and the voltage of the distribution network or even affecting electricity safety and reliability in residents' lives and industrial production.

Therefore, it is urgent in this field to solve the problem of disorderly charging of the charging station to eradicate overload at the charging station and avoid adverse impacts on the distribution network.

SUMMARY

The present disclosure provides a system for ordered charging management of a charging station. The system can eradicate overload at the charging station and avoid adverse impacts on the voltage and power of the distribution network. The present disclosure provides a method for ordered charging management of a charging station. The method has the preceding technical effects.

The present disclosure provides a system for ordered charging management of a charging station. The system includes a charging station control-management device, a charging pile monitoring device and a system platform server.

The system platform server is configured to set a power capacity of the charging station and to send the power capacity of the charging station to the charging station control-management device corresponding to the charging station.

The charging pile monitoring device is configured to collect an operating parameter of a charging pile corresponding to the charging pile monitoring device and to send the operating parameter to the charging station control-management device.

The charging station control-management device is configured to determine whether the charging station has a power headroom according to the power capacity and the operating parameter of all charging piles at the charging station after receiving a charging request sent by the charging pile monitoring device, to respond to the charging request immediately in response to determining that the charging station has the power headroom and to respond to the charging request in a delayed manner or adjust charging power of multiple charging piles in response to determining that the charging station has no power headroom.

The present disclosure further provides a method for ordered charging management of a charging station. The method includes:

sending, by a system platform server, a power capacity of the charging station to a charging station control-management device corresponding to the charging station;

collecting, by a charging pile monitoring device, an operating parameter of a charging pile corresponding to the charging pile monitoring device, and sending the operating parameter to the charging station control-management device; and determining, by the charging station control-management device, whether the charging station has a power headroom according to the power capacity and the operating parameter of all charging piles in the charging station after receiving a charging request sent from the charging pile monitoring device, to respond to the charging request immediately in response to determining that the charging station has the power headroom, and to respond to the charging request in a delayed manner or adjust charging power of at least one of the all charging piles in response to determining that the charging station has no power headroom.

BRIEF DESCRIPTION OF DRAWINGS

The drawings used in the related art and in the embodiments will be briefly described below. Apparently, the drawings described below illustrate merely some embodiments of the present disclosure, and those of ordinary skill in the art may obtain other drawings based on the drawings described below on the premise that no creative work is done.

DETAILED DESCRIPTION

One core of the present disclosure is to provide a system for ordered charging management of a charging station. The system can eradicate overload at the charging station and avoid adverse impacts on the voltage and power of the distribution network. Another core of the present disclosure is to provide a method for ordered charging management of a charging station. The method has the preceding technical effects.

Solutions in embodiments of the present disclosure will be described clearly and completely in connection with the drawings in embodiments of the present disclosure. Apparently, the embodiments described below are part, not all, of embodiments of the present disclosure. Based on embodiments of the present disclosure, all other embodiments obtained by those skilled in the art without creative work are within the scope of the present disclosure.

Figure 1:
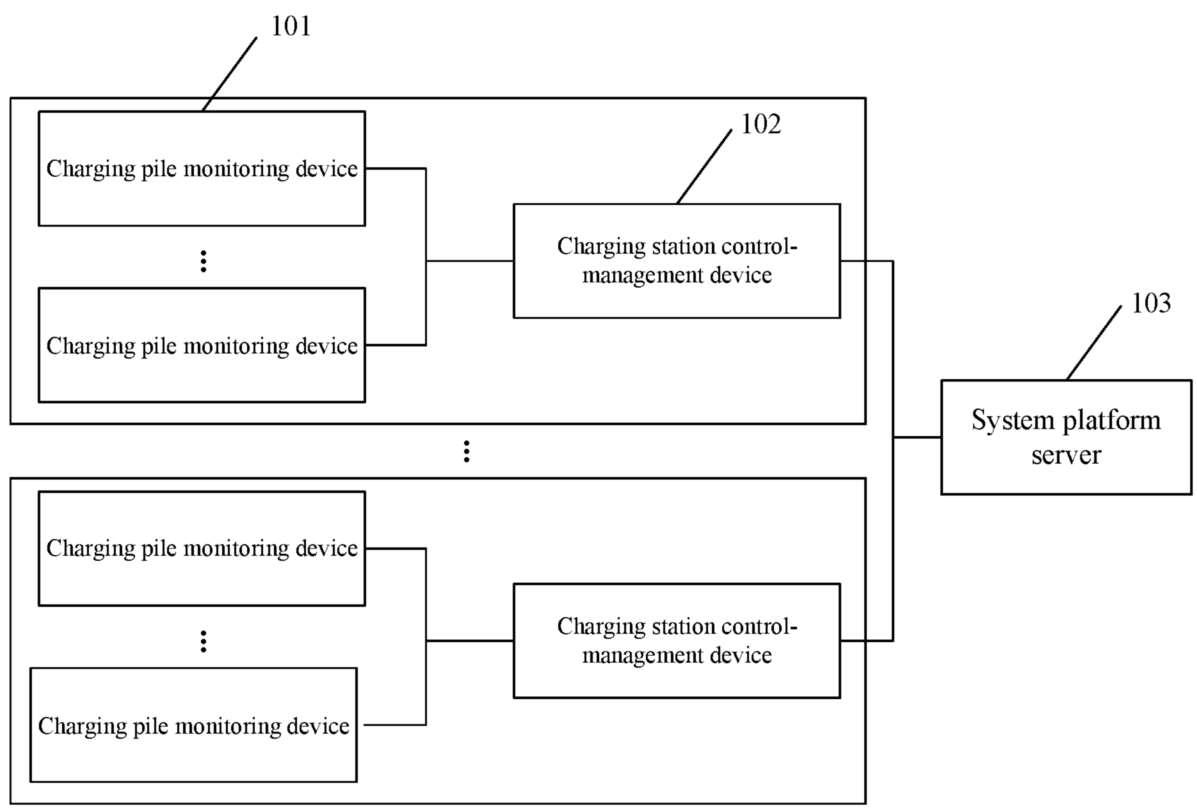
FIG. 1 is a schematic diagram illustrating a system for ordered charging management of a charging station according to embodiments of the present disclosure.

FIG. 1 is a schematic diagram illustrating a system for ordered charging management of a charging station according to embodiments of the present disclosure. Referring to FIG. 1, the system for ordered charging management of a charging station may include a charging pile monitoring device 101, a charging station control-management device 102 and a system platform server 103.

In one embodiment, the system platform server 103 may manage one or more charging stations within the current power distribution area. When managing orderly charging of the one or more charging stations, the system platform server 103 may set a corresponding power capacity for each charging station, where different power capacities may be set for different charging stations, and then send the power capacity of each charging station to the corresponding charging station control-management device 102 to provide an analysis and judgment basis for the charging station control-management device 102. The preceding power capacity is the maximum charging power value allowed by the charging station and set by the system platform server 103 to avoid overload and is different from the maximum charging power value actually providable by the charging station. Usually the power capacity of the charging station is less than the maximum charging power value actually providable by the charging station.

Charging pile monitoring devices 101 are in one-to-one correspondence with charging piles, that is, each charging pile can be provided with one charging pile monitoring device 101, so that the charging pile monitoring device 101 collects the operating parameters of the corresponding charging pile and sends the collected operating parameters of the charging pile to the charging station control-management device 102. The preceding operating parameters may include a charging current, a charging voltage, charging power, etc. In addition, the charging pile monitoring device 101 is also responsible for sending the charging request of an electric vehicle to the charging station control-management device 102, and receiving a charging request responded to by the charging station control-management device 102 immediately or a charging request responded to by the charging station control-management device 102 in a delayed manner or adjusting the control command of the charging power of at least one charging pile, and the operating status of the charging pile is adjusted according to the control command.

The charging station control-management device 102 can control all charging piles in the charging station. The charging station control-management device 102 is configured to determine whether a charging pile is allowed to charge an electric vehicle and to adopt different control strategies in different situations. For example, the charging station control-management device 102 determines whether the charging station has a power headroom according to the operating parameters of each charging pile and the power capacity of the charging station after receiving a charging request. In condition that the charging station has a power headroom, the charging station control-management device 102 responds to the charging request and sends a control command for allowing charging to the corresponding charging pile monitoring device 101 to allow the corresponding charging pile to charge an electric vehicle. In condition that the charging station has no power headroom, the charging station control-management device 102 responds to the charging request in a delayed manner or adjusts the charging power of at least one charging pile. Responding to the charging request in a delayed manner means that the charging station control-management device 102 does not respond to the charging request immediately, and responds to the charging request when the charging station regains a power headroom. Adjusting the charging power of at least one charging pile means that the charging station control-management device 102 responds to the charging request immediately and meanwhile, adjusts the charging power of at least one charging pile to make at least one charging pile charge using the adjusted charging power, ensuring that the total charging power of the charging station does not exceed the power capacity of the charging station. The charging station control-management device 102 determines whether the charging station has a power headroom through the following manner: adding up the charging power of all charging piles to obtain the total charging power, calculating the difference between the total charging power and the power capacity of the charging station to obtain a power difference, comparing the power difference with the requested power of a user, determining that the charging station has no power headroom in response to the power difference being less than the requested power of the user, and determining that the charging station has a power headroom in response to the power difference being greater than the requested power of the user.

In the case where the charging request is responded to in a delayed manner, the charging station control-management device 102 may sort all electric vehicles to be charged, and when the charging station has a power headroom, for example, when charging by a charging pile ends to make the charging station have a power headroom, the charging station control-management device 102 may sequentially respond to, according to the sort order, the charging requests of all electric vehicles to be charged. All electric vehicles to be charged may be sorted in chronological order of receiving the charging requests, that is, "first come, first charged". Alternatively, all electric vehicles to be charged may be sorted according to discount prices of the charging station. For example, electric vehicles are preferentially arranged in charging price discount periods. Alternatively, all electric vehicles to be charged may be sorted by user credit rating. Naturally, it is arranged that electric vehicles with high credit rating are charged first and electric vehicles with low credit rating are charged later. Of course, combined with the actual situation, it is feasible to sort according to the preceding factors comprehensively or to sort in other manners as needed.

In addition, the charging station control-management device 102 may also mark the state of the charging pile monitoring device 101. When a charging pile is charging, the state of the corresponding charging pile monitoring device 101 may be marked as the charging state and the value of the charging pile monitoring device 101 whose state is marked as the charging state is increased by one. When a charging pile ends charging, the state of the corresponding charging pile monitoring device 101 may be marked as the disconnected state and the value of the charging pile monitoring device 101 whose state is marked as the charging state is decreased by one. In this way, the charging station control-management device 102 can know whether or not a charging pile ends charging by polling the value of the charging pile monitoring device 101 in the charging state. When a charging pile ends charging, the electric vehicle arranged to be charged first is allowed to be charged.

In the case of adjusting the charging power of the charging pile, the charging station control-management device 102 may merely adjust the charging power of the current charging pile, that is, the charging power of the charging pile for which a charging request is sent; or the charging station control-management device 102 may adjust the charging power of at least one charging pile so that at least one charging pile charges by using the adjusted charging power.

In an embodiment, in the case of adjusting the charging power of multiple charging piles, under the condition that the power capacity of the charging station is not exceeded, the charging power of the multiple charging piles may be adjusted by equal distribution, that is, the adjusted charging piles have the same charging power; or the charging power of the multiple charging piles may be adjusted by unequal distribution, that is, the adjusted charging piles have unequal charging power. The adjustment manner is not limited in this embodiment and may vary with actual conditions.

In summary, the system for ordered charging management of a charging station provided in the present disclosure can effectively control the charging station. By limiting the charging of the charging pile, the system can control the electrical power of the charging station within an allowable range to eradicate overload at the charging station, to avoid adverse impacts on the overload and the voltage of the distribution network and to ensure the normal use of electricity by residents and businesses in the distribution area.

In an embodiment, the system platform server 103 is further configured to display the operating status of all charging piles in the charging station and the charging status of electric vehicles. In an embodiment, to make it easy for charging station administrators and users to learn the operating status of the charging station and the charging status of electric vehicles, for example, to make it easy for charging station administrators to know the implementation effect of the charging station, the system platform server 103 can also display the operating status of all charging piles in the charging station and the charging status of electric vehicles. For example, the system platform server 103 can display the operating status of all charging piles at the charging station. The operating status includes the charging power of each charging pile, the total charging power of the charging station, the quantity and serial numbers of idle charging piles, the quantity and serial numbers of charging piles being charging, charging queue status, and the charging duration of each electric vehicle. Therefore, on the one hand, the administrator can view the preceding content through a relevant mobile device, for example, through a mobile phone, to know the operating status of the charging station, so as to facilitate real-time monitoring and management of the charging station; on the other hand, the user can use the mobile device and a relevant APP to learn the preceding information, so as to make it easy for the user to select the optimal charging time and location according to preceding information. For example, in condition that the current charging station has a large number of people in the queue, the user can select other charging stations. Furthermore, when the user's electric vehicle is being charged, the user can also know the charging status of the electric vehicle, such as the charging duration and the remaining duration, so that the user has an experience of smarter charging.

In an embodiment, the charging station control-management device 102 is further configured to obtain the total electricity consumption parameters of the charging station and the total operating parameters of the charging piles and send the total electricity consumption parameters and the total operating parameters to the system platform server 103. The system platform server 103 is further configured to determine whether to enable an ordered charging control mode according to the total electricity consumption parameters and the total operating parameters and send an enabling command to the charging station control-management device 102 when the charging control mode is enabled.

This embodiment controls whether to enable the ordered charging control mode to achieve a more intelligent charging station management effect. For example, the charging station control-management device 102 can obtain the total electricity consumption parameters of the charging station, including voltage, current, power, and electric quantity, from the power distribution cabinet. The charging station control-management device 102 can also obtain the total operating parameters of the charging piles, including the number of times of charging, charging time, and charging power, from the charging pile monitoring devices 101. In an embodiment, the charging station control-management device 102 sends the obtained total electricity consumption parameters and total operating parameters to the system platform server 103. Further, the system platform server 103 analyzes the total electricity consumption parameters and the total operation parameters to obtain electricity consumption characteristics of the charging station and the residents at different times, and determines whether to enable the ordered charging control mode. For example, it is learned from the preceding analysis that less power is consumed at the charging station on working days, and even if the ordered charging control mode is not enabled on working days, the distribution network will not be affected; therefore, the system platform server 103 may not enable the ordered charging control mode on working days, that is, charging of charging piles is not limited on working days. Correspondingly, on non-working days, it is feasible to enable the ordered charging control mode and send the enabling command to the charging station control-management device 102, so that when receiving a charging request, the charging station control-management device 102 controls, according to the orderly charging control strategy, whether a charging pile charges.

In an embodiment, the background management server may further set a charging discount period according to the charging characteristics of the charging station and the residents. For example, it is known from the analysis that the peak hours of residents' electricity consumption are from 11:00 to 13:00 and the off-peak hours of residents' electricity consumption are from 13:00 to 17:00. Therefore, it is feasible to set 13:00 to 17:00 as a charging discount period, so that users can choose to charge in this charging discount period to avoid the peak hours of residents' electricity consumption, achieve "peak load shifting and valley load filling", and avoid adverse impacts on the distribution network.

In an embodiment, the system platform server 103 is further configured to adjust the power capacity of the charging station according to the total electricity consumption parameters of the charging station and the total operating parameters of the charging piles.

In an embodiment, the system platform server 103 may adjust, on the basis of enabling the orderly ordered charging management mode, the power capacity of the charging station according to the total electricity consumption parameters of the charging station and the total operating parameters of the charging piles. For example, the system platform server 103 can obtain information on electricity consumption of the charging station and the residents according to the total electricity consumption parameters of the charging station and the total operating parameters of the charging piles, and dynamically adjust the power capacity of the charging station according to the information on electricity consumption. For example, when the proportion of electricity consumption by the residents is relatively high, the power capacity of the charging station can be reduced accordingly;

when the proportion of electricity consumption by the residents is relatively low, the power capacity of the charging station can be increased accordingly. The power capacity of the charging station is dynamically adjusted to ensure the charging efficiency without increasing the overload, better meeting the charging demand of an electric vehicle.

In an embodiment, the system platform server 103 is further configured to evaluate the implementation effect of the ordered charging control mode and to adjust the ordered charging control mode according to the evaluation result.

In an embodiment, the system platform server 103 can also evaluate the implementation effect of the charging control mode according to the actual electricity consumption. For example, the system platform server 103 can also evaluate whether the enabling time of the ordered charging control mode is appropriate and whether the setting of the power capacity of the charging station is appropriate. After completing the preceding evaluation, the system platform server 103 can also correspondingly adjust the ordered charging control mode according to the evaluation result and improve the implementation of the orderly charging control strategy.

The system for ordered charging management of a charging station provided in the present disclosure includes a charging station control-management device, a charging pile monitoring device and a system platform server. The system platform server is configured to send a power capacity of the charging station to the charging station control-management device corresponding to the charging station. The charging pile monitoring device is configured to collect an operating parameter of a charging pile corresponding to the charging pile monitoring device and to send the operating parameter to the charging station control-management device. The charging station control-management device is configured to determine whether the charging station has a power headroom according to the power capacity and the operating parameter of all charging piles at the charging station after receiving a charging request sent by the charging pile monitoring device, to respond to the charging request immediately in condition that the charging station has the power headroom, and to respond to the charging request in a delayed manner or adjust charging power of at least one of the charging piles in condition that the charging station has no power headroom.

Figure 2:
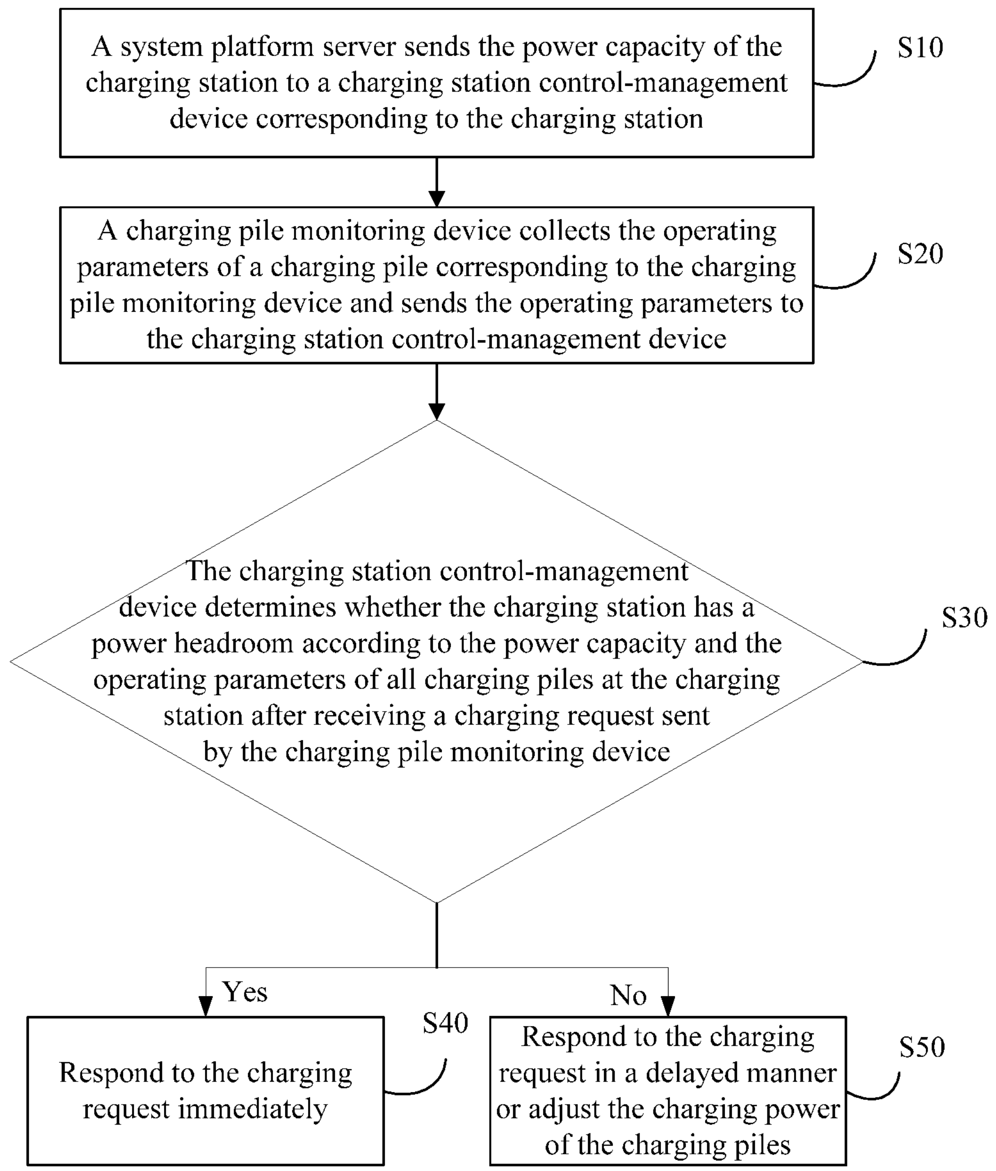
FIG. 2 is a flowchart illustrating a method for ordered charging management of a charging station according to embodiments of the present disclosure.

The present disclosure further provides a method for ordered charging management of a charging station. The method for ordered charging management of a charging station described below and the system for ordered charging management of a charging station described above can be referred to by each other. 。FIG. 2 is a flowchart of a method for ordered charging management of a charging station according to embodiments of the present disclosure. Referring to FIG. 2, the method may include steps S10 through S50.

In step S10, a system platform server sends the power capacity of the charging station to a charging station control-management device corresponding to the charging station.

In step S20, a charging pile monitoring device collects the operating parameters of a charging pile corresponding to the charging pile monitoring device and sends the operating parameters to the charging station control-management device.

In step S30, the charging station control-management device determines whether the charging station has a power headroom according to the power capacity and the operating parameters of all charging piles at the charging station after receiving a charging request sent by the charging pile monitoring device.

In step S40, the charging station control-management device responds to the charging request immediately in condition that the charging station has a power headroom.

In step S50, the charging station control-management device responds to the charging request in a delayed manner or adjusts the charging power of at least one of the charging piles in condition that the charging station has no power headroom.

In an embodiment, the method further includes that the system platform server displays the operating status of all charging piles at the charging station and the charging status of electric vehicles.

In an embodiment, the method further includes that the charging station control-management device reads the total electricity consumption parameters of the charging station and the total operating parameters of the charging piles and sends the total electricity consumption parameters and the total operating parameters to the system platform server; and the system platform server 103 determines whether to enable an ordered charging control mode according to the total electricity consumption parameters and the total operating parameters and sends an enabling command to the charging station control-management device when the charging control mode is enabled.

In an embodiment, the method further includes that the system platform server adjusts the power capacity of the charging station according to the total electricity consumption parameters and the total operating parameters.

In an embodiment, the method further includes that the system platform server evaluates the implementation effect of the ordered charging control mode and adjusts the ordered charging control mode according to the evaluation result.

In an embodiment, determining whether the charging station has a power headroom according to the power capacity and the operating parameters of each charging piles at the charging station includes: determining the difference between the total charging power of all charging piles and the power capacity of the charging station to obtain a power difference; determining whether the power difference is greater than requested power; determining that the charging station has a power headroom in response to the power difference being greater than the requested power; and determining that the charging station has no power headroom in response to the power difference being not greater than the requested power.

In an embodiment, the operating status of all charging piles at the charging station includes: the charging power of each charging pile, the total charging power of the charging station, the quantity and serial numbers of idle charging piles, the quantity and serial numbers of charging piles being charging, and charging queue status; and the charging status of electric vehicles includes the charging duration of each electric vehicle.

For the description of the method for ordered charging management of a charging station provided in the present disclosure, see the embodiments of the preceding system for ordered charging management of a charging station. Such description will not be repeated here.

In the system for ordered charging management of a charging station provided in the present disclosure, a charging pile monitoring device monitors the operating status of a charging pile and sends the obtained operating parameters of the charging pile to a charging station control-management device; a system platform server sends the power capacity of the charging station to the charging station control-management device; and the charging station control-management device determines whether the charging station has a power headroom according to the operating parameters of all charging piles at the charging station and the power capacity of the charging station after receiving a charging request, and responds to the charging request in a delayed manner or adjusts the charging power of all charging piles in condition that the charging station has no power headroom. The system for ordered charging management of a charging station controls whether a charging pile charges, so that the system can control the electrical power of the charging station within an allowable range to achieve "peak load shifting and valley load filling" of the load of the distribution network effectively, promote consumption of clean energy, reduce impacts on the load of the distribution network when a large number of electric vehicles are disorderly charged, and ensure the normal use of electricity by residents and businesses. In addition, the method for ordered charging management of a charging station provided in the present disclosure can effectively reduce the impacts of electric vehicles on the distribution network, thereby slowing down the investment and construction of the distribution network and facilitating the coordinated development of electric vehicles and the distribution network.

Embodiments in this specification are described in a progressive manner. Each embodiment focuses on differences from other embodiments. The same or similar parts in the embodiments can be referred to by each other. The apparatus, device and computer-readable storage medium disclosed in the embodiments correspond to the method disclosed in the embodiments and thus are briefly described. For the relevant parts of the apparatus, device and computer-readable storage medium, see the description of the method.

Those skilled in the art will appreciate that the elements and algorithm steps in the various examples described in connection with the embodiments disclosed herein can be implemented by electronic hardware, computer software or a combination thereof. To clearly illustrate the interchangeability between hardware and software, this specification generally describes the components and steps in the various examples according to functions. Whether these functions are implemented by hardware or software depends on the specific application and design constraints of the solution. Those skilled in the art can use different methods to implement the described functions for each particular application, but such implementation should not be construed as departing from the scope of the present disclosure.

The steps of the method or algorithm described in connection with the embodiments disclosed herein can be implemented by hardware, software modules executed by a processor or a combination thereof. The software modules can be disposed in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage medium known in the art.

What is claimed is:

1. A system for ordered charging management of a charging station, the system comprising: a charging station control-management device, a charging pile monitoring device and a system platform server, wherein the system platform server is configured to send a power capacity of the charging station to the charging station control-management device corresponding to the charging station;

wherein the charging pile monitoring device is configured to collect an operating parameter of a charging pile corresponding to the charging pile monitoring device and to send the operating parameter to the charging station control-management device; and wherein the charging station control-management device is configured to determine whether the charging station has a power headroom according to the power capacity and operating parameters of all charging piles in the charging station after receiving a charging request sent from the charging pile monitoring device, to respond to the charging request immediately in response to determining that the charging station has the power headroom, and to respond to the charging request in a delayed manner or adjust charging power of at least one charging pile of the all charging piles in response to determining that the charging station has no power headroom.

2. The system of claim 1, wherein the system platform server is further configured to:

display operating status of the all charging piles in the charging station and charging status of electric vehicles.

3. The system of claim 2, wherein the charging station control-management device is further configured to: obtain a total electricity consumption parameter of the charging station and total operating parameters of the all charging piles and send the total electricity consumption parameter and the total operating parameters to the system platform server; and wherein the system platform server is further configured to: determine whether to enable an ordered charging control mode according to the total electricity consumption parameter and the total operating parameters and send an enabling command to the charging station control-management device in response to a determination result of enabling the ordered charging control mode.

4. The system of claim 3, wherein the system platform server is further configured to: adjust the power capacity of the charging station according to the total electricity consumption parameter and the total operating parameters.

5. The system of claim 4, wherein the system platform server is further configured to: evaluate an implementation effect of the ordered charging control mode and adjust the ordered charging control mode according to an evaluation result.

6. The system of claim 1, wherein the charging station control-management device is configured to determine whether the charging station has the power headroom according to the power capacity and the operating parameters of the all charging piles in the charging station through the following manner:

determining a difference between total charging power of the all charging piles and the power capacity of the charging station to obtain a power difference;

determining whether the power difference is greater than a requested power;

determining that the charging station has the power headroom in response to the power difference being greater than the requested power; and determining that the charging station has no power headroom in response to the power difference being not greater than the requested power.

7. The system of claim 1, wherein operating status of the all charging piles in the charging station comprises: charging power of each of the all charging piles, total charging power of the charging station, quantity and serial numbers of idle charging piles, quantity and serial numbers of charging piles being charging, and charging queue status; and charging status of electric vehicles comprises a charging duration of each electric vehicle of the electric vehicles.

8. A method for ordered charging management of a charging station, the method comprising:

sending, by a system platform server, a power capacity of the charging station to a charging station control-management device corresponding to the charging station;

collecting, by a charging pile monitoring device, an operating parameter of a charging pile corresponding to the charging pile monitoring device, and sending the operating parameter to the charging station control-management device; and determining, by the charging station control-management device, whether the charging station has a power headroom according to the power capacity and operating parameters of all charging piles in the charging station after receiving a charging request sent from the charging pile monitoring device, to respond to the charging request immediately in response to determining that the charging station has the power headroom, and to respond to the charging request in a delayed manner or adjust charging power of at least one charging pile of the all charging piles in response to determining that the charging station has no power headroom.

9. The method of claim 8, further comprising:

displaying, through the system platform server, operating status of the all charging piles in the charging station and charging status of electric vehicles.

10. The method of claim 9, further comprising:

obtaining, by the charging station control-management device, a total electricity consumption parameter of the charging station, and sending the total electricity consumption parameter and total operating parameters of the all charging piles to the system platform server; and determining, by the system platform server, whether to enable an ordered charging control mode according to the total electricity consumption parameter and the total operating parameters, and sending an enabling command to the charging station control-management device in response to a determination result of enabling the ordered charging control mode.

11. The method of claim 10, further comprising:

adjusting, by the system platform server, the power capacity of the charging station according to the total electricity consumption parameter and the total operating parameters.

12. The method of claim 11, further comprising:

evaluating, by the system platform server, an implementation effect of the ordered charging control mode, and adjusting the ordered charging control mode according to an evaluation result.

13. The method of claim 8, wherein the determining, by the charging station control-management device, whether the charging station has the power headroom according to the power capacity and the operating parameters of the all charging piles in the charging station comprises:

determining a difference between total charging power of the all charging piles and the power capacity of the charging station to obtain a power difference;

determining whether the power difference is greater than a requested power;

determining that the charging station has the power headroom in response to the power difference being greater than the requested power; and determining that the charging station has no power headroom in response to the power difference being not greater than the requested power.

14. The method of claim 8, wherein operating status of the all charging piles in the charging station comprises: charging power of each of the all charging piles, total charging power of the charging station, quantity and serial numbers of idle charging piles, quantity and serial numbers of charging piles being charging, and charging queue status; and charging status of electric vehicles comprises a charging duration of each electric vehicle of the electric vehicles.

* * * * *